United States Patent
Yun

(10) Patent No.: US 8,235,859 B2
(45) Date of Patent: Aug. 7, 2012

(54) POWER TRANSMISSION APPARATUS USING PLANETARY GEAR HAVING A PLURALITY OF GEAR TRAINS AND METHODS OF USE THEREOF

(76) Inventor: Keun Soo Yun, Seoul (KR)

( * ) Notice: Subject to any disclaimer, the term of this patent is extended or adjusted under 35 U.S.C. 154(b) by 76 days.

(21) Appl. No.: 12/676,855

(22) PCT Filed: Feb. 12, 2009

(86) PCT No.: PCT/KR2009/000672
§ 371 (c)(1),
(2), (4) Date: Mar. 5, 2010

(87) PCT Pub. No.: WO2009/102156
PCT Pub. Date: Aug. 20, 2009

(65) Prior Publication Data
US 2010/0311535 A1 Dec. 9, 2010

(30) Foreign Application Priority Data
Feb. 12, 2008 (KR) .................. 10-2008-0012468

(51) Int. Cl.
*F16H 3/62* (2006.01)
(52) U.S. Cl. ...................................... 475/290
(58) Field of Classification Search .................. 475/290, 475/342
See application file for complete search history.

(56) References Cited

U.S. PATENT DOCUMENTS

| | | | | |
|---|---|---|---|---|
| 641,097 A | * | 1/1900 | Gerard | 475/290 |
| 812,886 A | * | 2/1906 | Sears | 475/290 |
| 1,405,237 A | * | 1/1922 | Linden et al. | 475/290 |
| 3,969,957 A | * | 7/1976 | DeLalio | 475/79 |
| 4,621,541 A | * | 11/1986 | Takahashi | 475/146 |
| 5,865,703 A | * | 2/1999 | Shiokawa et al. | 475/269 |
| 6,599,219 B2 | * | 7/2003 | Pan | 475/317 |
| 7,662,061 B2 | * | 2/2010 | Nagao | 475/290 |

FOREIGN PATENT DOCUMENTS

| | | |
|---|---|---|
| JP | 06-263080 A | 9/1994 |
| JP | 07-269668 A | 10/1995 |
| JP | 2000-316914 A | 11/2000 |

OTHER PUBLICATIONS

International Search Report of International Application No. PCT/KR2009/000672.

* cited by examiner

*Primary Examiner* — Sherry Estremsky
(74) *Attorney, Agent, or Firm* — Kile Park Goekjian Reed & McManus PLLC

(57) ABSTRACT

Provided is a power transmission apparatus using a planetary gear having a plurality of gear trains. The apparatus includes: a housing including a cover which is open or closed, and a speed change locking unit which locks and releases selectively one of ring gears; a carrier installed inside the housing; a planet gear set including three or more different sized planet gears; a ring gear set including ring gears; a sun gear set including sun gears meshed with external teeth of the planet gears and having an output shaft which outputs power to an outside of the housing; and an input shaft which is aligned coaxially to the output shaft and rotates the carrier by external force transmitted from the outside of the housing. The input shaft extends out of the housing by passing through the shaft extension.

8 Claims, 6 Drawing Sheets

POWER TRANSMISSION APPARATUS USING PLANETARY GEAR HAVING A PLURALITY OF GEAR TRAINS AND METHODS OF USE THEREOF

TECHNICAL FIELD

The present invention relates to a power transmission apparatus using a planetary gear having a plurality of gear trains and a method of using the same. More particularly, the present invention relates to a power transmission apparatus using a planetary gear having a plurality of gear trains and a method of using the same, in which a plurality of planet gears and ring gears are arranged in a multiple structure to facilitate the speed change operation and to precisely transmit power.

[Background Art]

In general, a gear coupling is used to transmit great power or to precisely transmit power. A representative gear coupling is a planetary gear device.

A typical planetary gear device includes a carrier, at least two pairs of planet gears provided in the carrier, a ring gear internally meshed with the planet gears, and a sun gear externally meshed with the planet gears.

Acceleration/deceleration and output of the planetary gear device may vary depending on the gear ratio of each gear connected to an input shaft and an output shaft of the planetary gear device.

For instance, when a carrier is coupled with a driving shaft to rotate and a ring gear is fixed, the output is achieved through a sun gear. In this case, the rotation speed is increased in the rotation direction of the driving shaft. In addition, when the sun gear is coupled with the driving shaft to rotate and the carrier is fixed, the output is achieved through the ring gear and the rotation speed is decreased in the reverse direction.

That is, the rotation characteristic of the planetary gear device may vary depending on the operational condition of the sun gear, the ring gear and the carrier, so that the planetary gear device can be variously utilized. In particular, it is possible to adjust the acceleration/deceleration ratio of the planetary gear device according to the gear ratio of the sun gear and the ring gear.

DISCLOSURE

[Technical Problem]

An object of the present invention is to provide a power transmission apparatus using a planetary gear having a plurality of gear trains and a method of using the same, in which a ring gear set including a plurality of ring gears and a planet gear set including a plurality of planet gears having different gear ratios are provided such that the ring gears of the ring gear set are meshed with planet gears of the planet gear set, respectively, and various speed change ratios can be established through a sun gear by fixing a ring gear when power is input through a carrier.

[Technical Solution]

In order to accomplish the above object, there is provided a power transmission apparatus using a planetary gear having a plurality of gear trains, the power transmission apparatus comprising: a housing including a cover which is open or closed, and a speed change locking unit which locks and releases selectively one of ring gears; a carrier installed inside the housing; a planet gear set including three or more different sized planet gears, in which at least three pairs of the planet gear sets are installed on one side of the carrier to rotate freely; a ring gear set including ring gears, in which the planet gears mesh with internal teeth of the ring gears, respectively; a sun gear set including sun gears meshed with external teeth of the planet gears and having an output shaft which outputs power to an outside of the housing; and an input shaft which is aligned coaxially to the output shaft and rotates the carrier by external force transmitted from the outside of the housing.

According to the exemplary embodiment of the present invention, the planet gears of each planet gear set are sequentially stacked on the carrier in an order of diameters thereof.

According to the exemplary embodiment of the present invention, the ring gears of the ring gear set are formed at outer walls thereof with fixing slots which are spaced apart from each other at a regular interval.

According to the exemplary embodiment of the present invention, the ring gears have different diameters corresponding to sizes of the planet gears, respectively.

According to the exemplary embodiment of the present invention, the sun gears have different diameters such that the sun gears mesh with the planet gears, respectively.

According to the exemplary embodiment of the present invention, a gear ratio between the sun gear and the planet gear is set to 1:1.5.

According to the exemplary embodiment of the present invention, a gear ratio between the sun gear and the planet gear is set to 1:1.

According to the exemplary embodiment of the present invention, a gear ratio between the sun gear and the planet gear is set to 1:0.5.

According to the exemplary embodiment of the present invention, a gear ratio between the sun gears and the planet gears is set in a range of 1:0.5 to 1:3.

According to the exemplary embodiment of the present invention, the carrier includes a support for rotatably supporting each planet gear set and a shaft extension extending coaxially to the input shaft in parallel to the support.

According to the exemplary embodiment of the present invention, the input shaft extends out of the housing by passing through the shaft extension.

According to the exemplary embodiment of the present invention, the output shaft has a hollow pipe structure that surrounds an outer wall of the shaft extension.

According to the exemplary embodiment of the present invention, the speed change locking unit includes: a stopper that moves along a guide slot formed in the housing while being elastically supported so as to be selectively locked with one of fixing slots; a wire for adjusting a position of the stopper; and a body having a cover, which is open or closed, and formed in the housing to provide a movement route for the stopper.

According to the exemplary embodiment of the present invention, the cover includes a guide inserted into the stopper to guide sliding movement of the stopper.

In addition, there is provided a method of using a power transmission apparatus using a planetary gear having a plurality of gear trains. According to the method, power generated from a motor bicycle or a bicycle is transmitted through the power transmission apparatus according to the present invention.

The features and advantages of the present invention will become more apparent from the following detailed description when taken in conjunction with the accompanying drawings. The terms or words used in the specification and claims must not be merely interpreted based on dictionary meaning thereof, but they should be interpreted in combination with the technical scope of the present invention.

[Advantageous Effects]

The power transmission apparatus using a planetary gear having a plurality of gear trains and a method of using the same according to the present invention have the following effects.

1) Various speed change ratios can be obtained by fixing each ring gear of the ring gear set.

2) The input shaft can be extended to the output side, so that the power transmission apparatus is applicable to two-wheeled vehicles, such as bicycles.

3) Great power can be precisely transmitted by a planetary gear, so that the power transmission apparatus is applicable to motor bicycles.

4) The speed change ratio can be adjusted by varying the number of teeth formed in the planet gear, the sun gear and the ring gear.

BEST MODE

Figure 1:
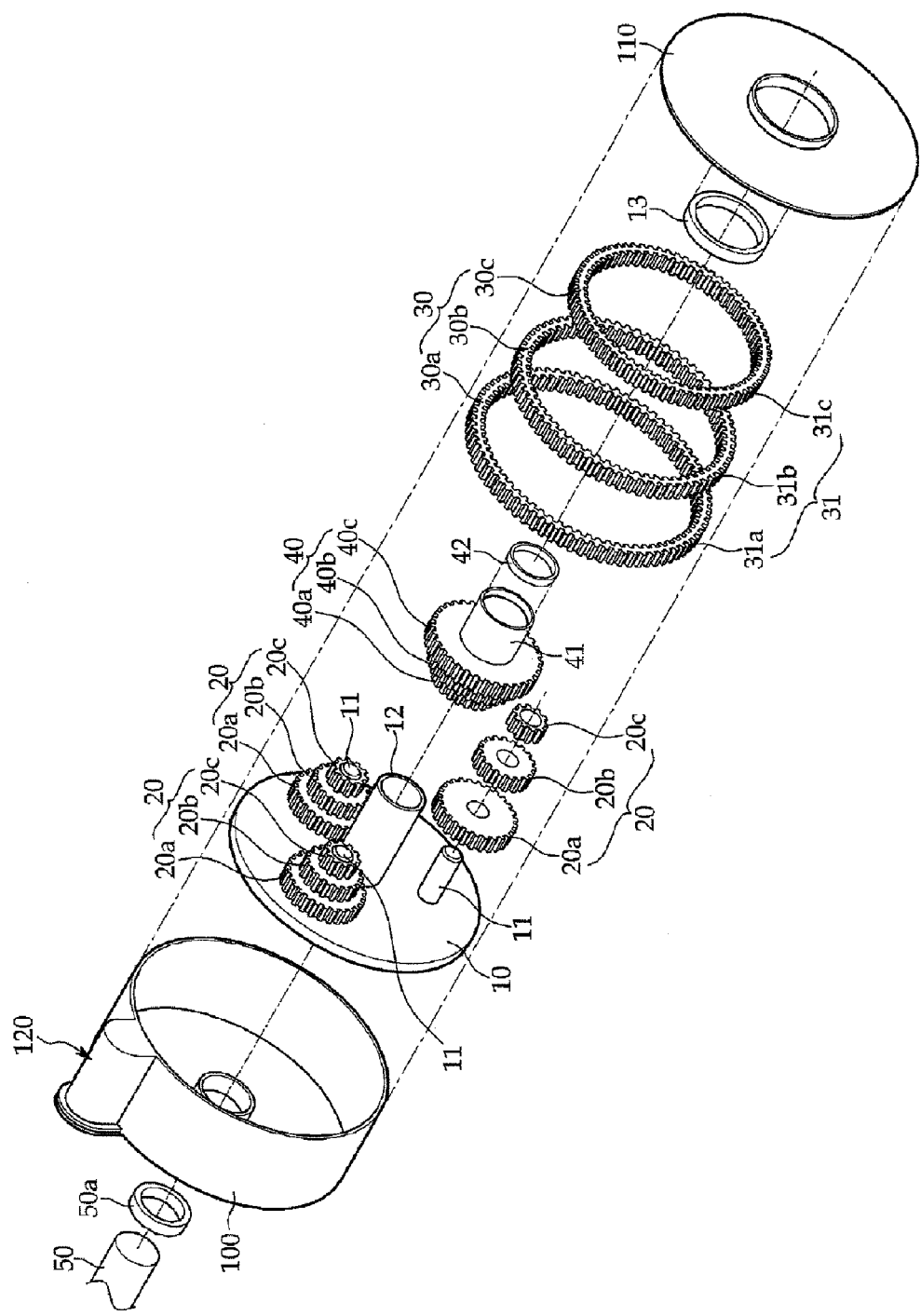
FIG. 1 is an exploded perspective view showing a power transmission apparatus using a planetary gear having a plurality of gear trains according to the present invention.

Hereinafter, a power transmission apparatus using a planetary gear having a plurality of gear trains and a method of using the same according to the present invention will be described in detail with reference to the accompanying drawings.

The same reference numerals are used to designate the same elements throughout the drawings. In addition, a detailed description of known functions and configurations incorporated herein will be omitted when it may make the subject matter of the present invention rather unclear.

Figure 2:
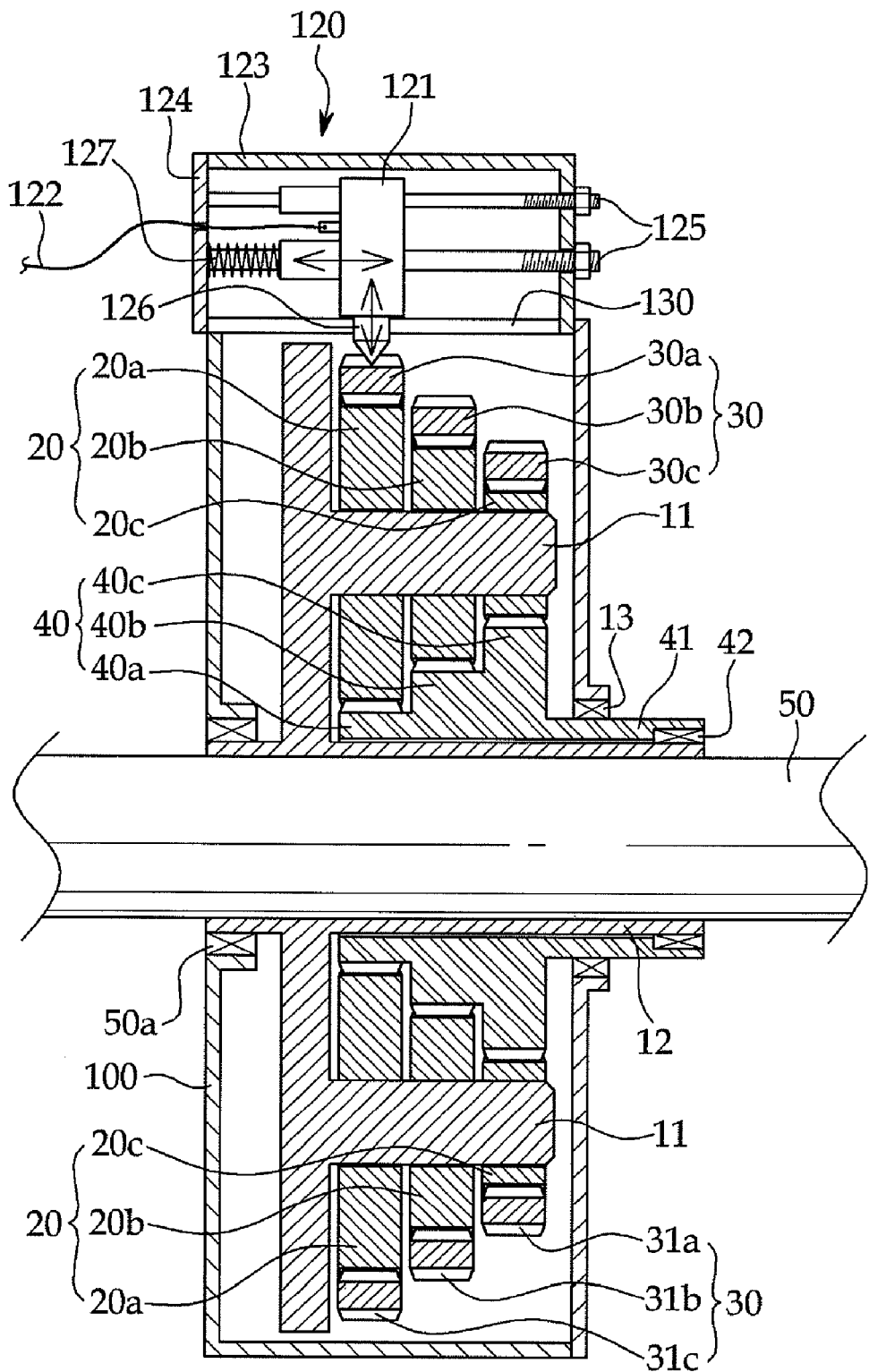
FIG. 2 is an offset sectional view showing the mounting state of a ring gear set according to an embodiment of the present invention.
Figure 3:
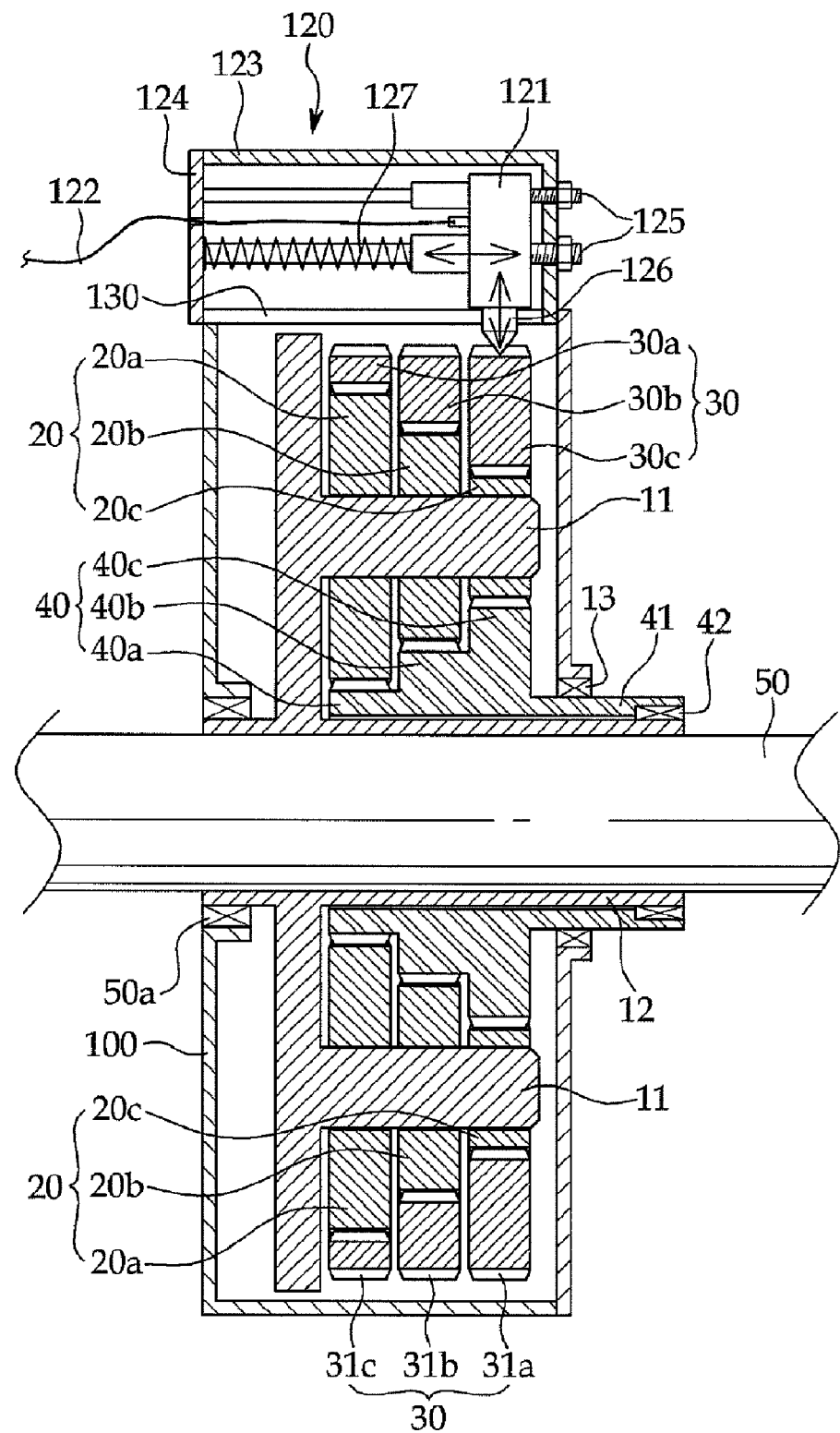
FIG. 3 is an offset sectional view showing the mounting state of a ring gear set according to another embodiment of the present invention.
Figure 4:
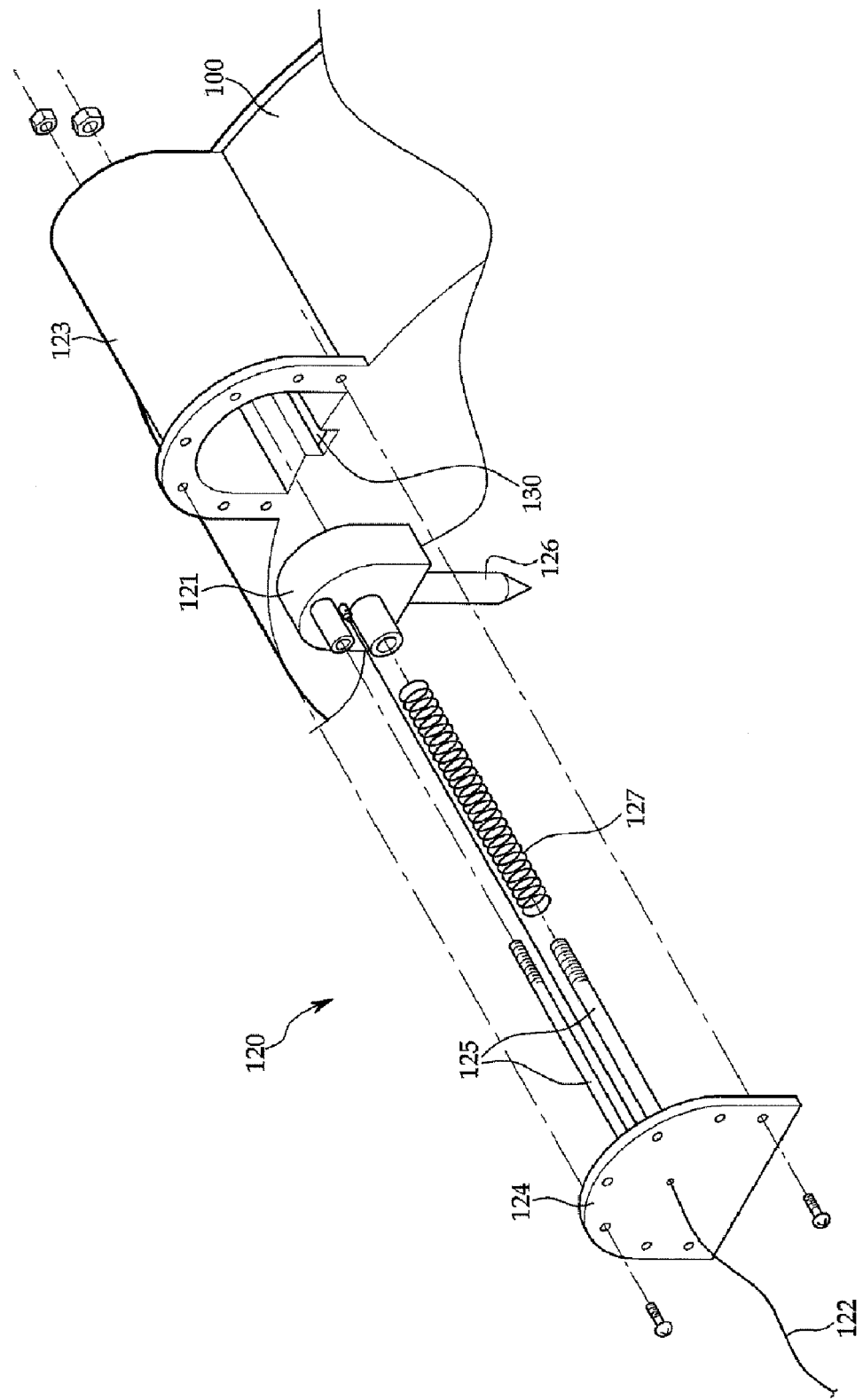
FIG. 4 is an exploded perspective view showing the structure of a speed change locking unit according to the present invention.
Figure 5:
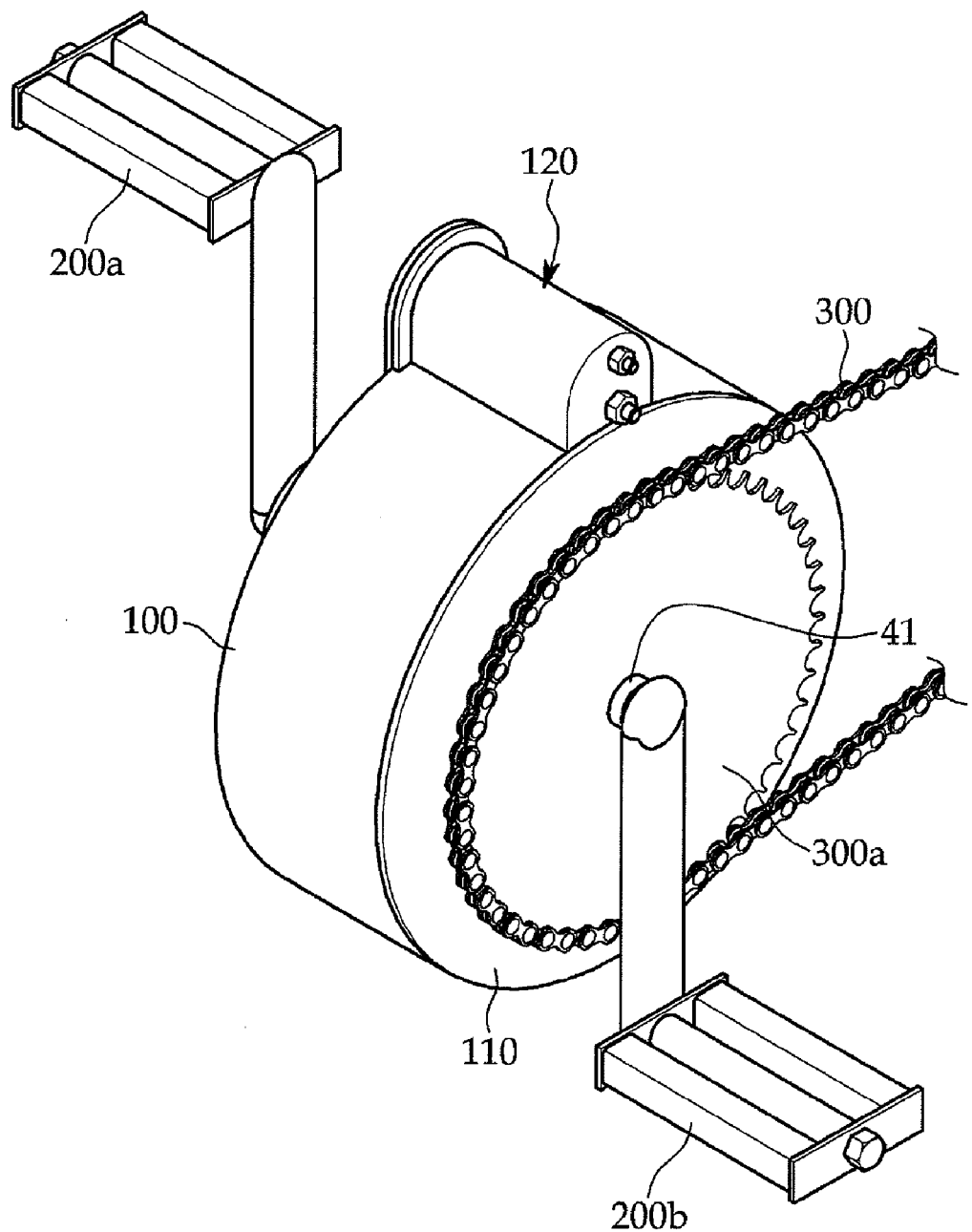
FIG. 5 is a perspective view showing an example of application of a power transmission apparatus using a planetary gear having a plurality of gear trains according to the present invention.
Figure 6:
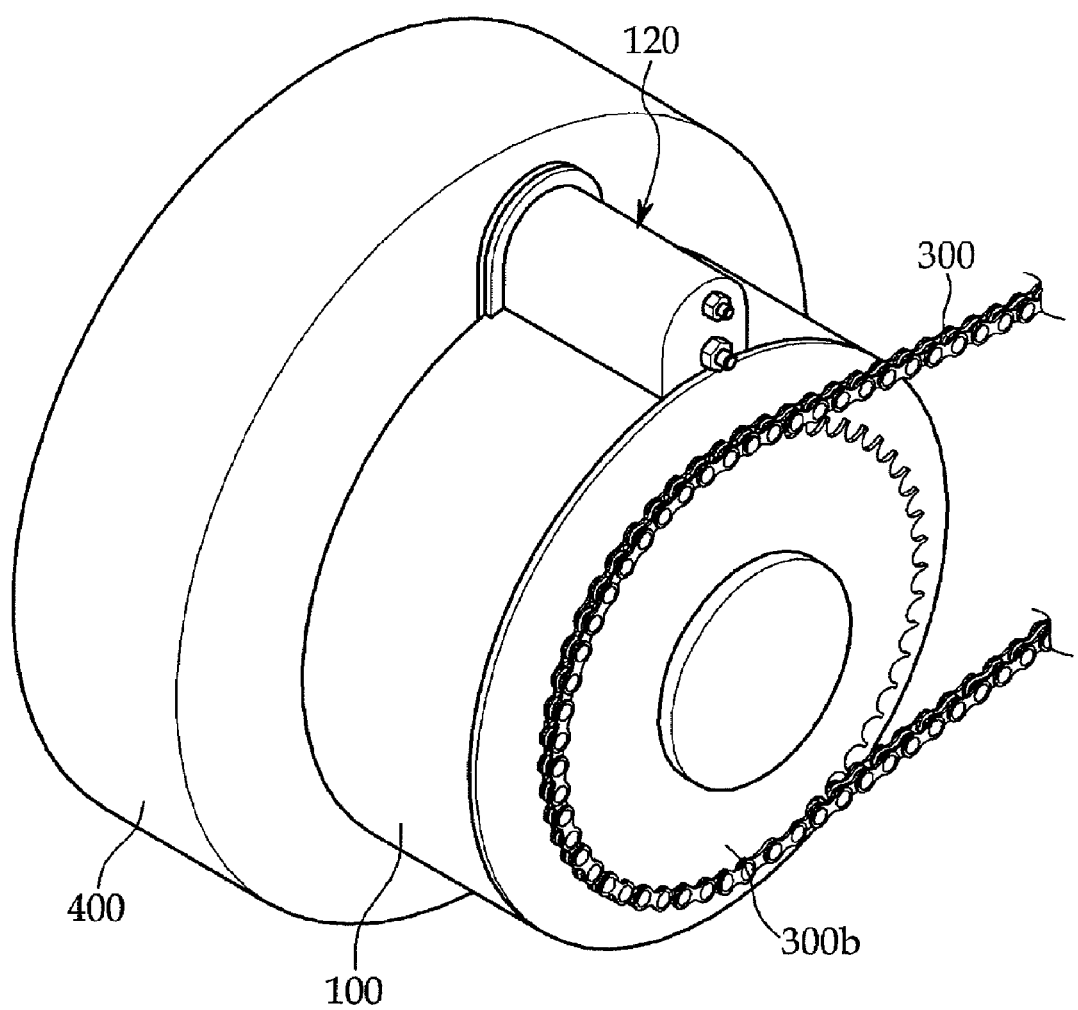
FIG. 6 is a perspective view showing another example of application of a power transmission apparatus using a planetary gear having a plurality of gear trains according to the present invention.

FIG. 1 is an exploded perspective view showing a power transmission apparatus using a planetary gear having a plurality of gear trains according to the present invention, FIGS. 2 and 3 are offset sectional views showing the mounting state of a ring gear set according to embodiments of the present invention, and FIG. 4 is an exploded perspective view showing the structure of a speed change locking unit according to the present invention. In addition, FIGS. 5 and 6 are perspective views showing examples of application of the power transmission apparatus using the planetary gear having the plurality of gear trains according to the present invention.

Referring to FIG. 1, the power transmission apparatus according to the present invention includes a carrier 10, a planet gear set 20, a ring gear set 30, a sun gear set 40, an input shaft 50, and a housing 100.

The carrier 10 has a plate shape and a shaft extension 12 protrudes from the center of the carrier 10. In addition, at least three supports 11, which are spaced apart from each other in the circumferential direction at a regular interval, are provided around the shaft extension 12 to install the planet gear set 20 on the carrier 10.

The carrier 10 is installed in the housing 10 such that the input shaft 50 can be rotatably connected to a rear surface of the carrier 10. The input shaft 50 is supported by a bearing 40a installed in the housing 100. In addition, the shaft extension 12 is rotatably coupled with an output shaft 41 while being supported by a bearing 42.

The planet gear set 20 includes at least three planet gears 20a, 20b and 20c. The three planet gears 20a, 20b and 20c have different radii from each other. The three planet gears 20a, 20b and 20c are sequentially fitted around the supports 11 in the order of diameter thereof.

At least three planet gear sets 20 are fitted around the supports 11. In particular, the first to third planet gears 20a, 20b and 20c of each planet gear set 20 can be rotated independently from each other.

According to the exemplary embodiment of the present invention, the planet gear set 20 includes three planet gears 20a, 20b and 20c. However, the planet gear set 20 may include four or five planet gears to enable the 4-step speed change or 5-step speed change.

The ring gear set 30 includes at least three ring gears 30a, 30b and 30c. The three ring gears 30a, 30b and 30c are internally meshed with the three planet gears 20a, 20b and 20c of the planet gear set 20 fitted around the support 12. That is, the first ring gear 30a is meshed with the first planet gear 20a, the second ring gear 30b is meshed with the second planet gear 20b, and the third ring gear 30c is meshed with the third planet gear 20c. In addition, the first to third ring gears 30a, 30b and 30c are formed at outer walls thereof with fixing slots 31a, 31b and 31c, respectively. In particular, as shown in FIGS. 2 and 3, the first to third ring gears 30a, 30b and 30c may have the same diameter or not. If the first to third ring gears 30a, 30b and 30c are different in diameters, as shown in FIG. 2, the fixing slots 31a, 31b and 31c are preferably inclined in such a manner that a stopper 121, which will be described later, can be prevented from being embedded between ring gears upon the speed change operation.

The ring gears 30a, 30b and 30c are meshed with the planet gears 20a, 20b and 20c such that the ring gears 30a, 30b and 30c can rotate independently from the planet gears 20a, 20b and 20c.

The sun gear set 40 includes at least three sun gears 40a, 40b and 40c meshed with the planet gears 20a, 20b and 20c of the planet gear set 20. In particular, the output shaft 41 is provided in the sun gear set 40. The sun gears 40a, 40b and 40c are fixed to the output shaft 41 so that the sun gears 40a, 40b and 40c are simultaneously rotated.

The output shaft 41 has a hollow structure and surrounds the shaft extension 12 of the carrier 10 without making contact with the shaft extension 12 of the carrier 10. The output shaft 41 protrudes out of the housing 100. As shown in FIGS. 2 and 3, an inner wall of the output shaft 41 is supported by the bearing 42 fitted around the shaft extension 12 and an outer wall of the output shaft 41 is supported by a bearing 13 installed in a cover 110. A sprocket or a gear is mounted on the output shaft 41 protruding out of the housing 100.

According to the exemplary embodiment of the present invention, the sun gears 40a, 40b and 40c are meshed with the planet gears 20a, 20b and 20c at the gear ratio of 1:0.5 to 1:1.5. This gear ratio can be properly selected suitably for the speed change.

The input shaft 50 is vertically installed on the rear surface of the carrier 10 where the supports 11 are not provided. As shown in FIGS. 2 and 3, the input shaft 50 is aligned coaxially to the shaft extension 12 and supported by a bearing 50*a* installed in the housing 100 so as to rotate together with the carrier 10. In FIGS. 2 and 3, the input shaft 50 extends by passing through the housing 100 so that power transmission is achieved at both sides of the housing 100.

In particular, if the input shaft 50 is applied to an apparatus operated by two feet of a user, such as a bicycle, the input shaft 50 can extend out of the housing 100 through the shaft extension 12. In this case, the input shaft 50 is rotatable through output shaft 41 and the bearing 42.

The housing 100 includes the cover 110, which can be open or closed, and accommodates the planetary gear therein. In particular, the housing 100 has a cylindrical structure and a speed change locking unit 120 is provided at an outer wall of the housing 100 to control the operation of the ring gear set 30.

As shown in FIG. 4, the speed change locking unit 120 includes a stopper 121 that moves along a guide slot 130 formed widthwise along the housing 100, a wire 122 for adjusting the position of the stopper 121, and a body 123 providing the movement route of the stopper 121.

The stopper 121 moves along the guide slot 130 and is inserted into one of the fixing slots 31*a*, 31*b* and 31*c* of the first to third ring gears 30*a*, 30*b* and 30*c* to fix one of the first to third ring gears 30*a*, 30*b* and 30*c*. In particular, a tip part 126 of the stopper 121, which is inserted into the fixing slot 31, is elastically moved up and down. That is, when the ring gears 30*a*, 30*b* and 30*c* have different diameters as shown in FIG. 2, the tip part 126 makes contact with the ring gears 30*a*, 30*b* and 30*c* while moving up and down. Preferably, a lower end of the tip part 126 has a conical shape. In this case, when the tip part 126 is embedded between two ring gears 30*a* and 30*b*, the tip part 126 can easily move to one ring gear, thereby preventing the two ring gears 30*a* and 30*b* from being simultaneously fixed.

The stopper 121 is installed in the body 123 in such a manner that the tip part 126 of the stopper 121 can be selectively inserted into the fixing slot 31 while moving along the guide slot 130. Referring to FIGS. 2 and 3, the stopper 121 is always meshed with one of the ring gears 30*a*, 30*b* and 30*c*. However, the stopper 121 can be maintained in an idle state without being meshed with the ring gears 30*a*, 30*b* and 30*c*. In the idle state, the stopper 121 is decoupled from the fixing slot 31*a* of the first ring gear 30*a* while being supported by a spring 127 in the body 123.

One end of the wire 122 is fixed to the stopper 121 and the other end of the wire 122 is exposed out of the body 123. The wire 122 is connected to a speed change unit. In the case of a bicycle, the wire 122 is connected to a speed change lever. The wire 122 allows the stopper 121 to move along the guide slot 130 while being supported by the spring 127 according to the operation of the speed change lever.

The body 123 has the cover 124, which can be open or closed. The body 123 provides a space for allowing the stopper 121 to move along the guide slot 130. The cover 124 is formed with at least one guide 125 into which the stopper 121 is fitted to slide lengthwise, so that the stopper 121 can be easily moved by manipulating the wire 122.

Embodiment of Power Transmission Apparatus

The speed of the power transmission apparatus using the planetary gear having a plurality of gear trains according to the present invention may vary depending on teeth of each gear. In addition, since the ring is fixed in the power transmission apparatus according to the present invention, only the forward movement and acceleration/deceleration are possible in the power transmission apparatus.

In addition, the gear ratio between the first sun gear 40*a* and the first planet gear 20*a* is set to 1:1.5, the gear ratio between the second sun gear 40*b* and the second planet gear 20*b* is set to 1:1, and the gear ratio between the third sun gear 40*c* and the third planet gear 20*c* is set to 1:0.5. Through the above gear ratios, the power transmission apparatus can attain the 3-step speed change. When the gear ratio is set to 1:1.5, 4-times speed acceleration is achieved. When the gear ratio is set to 1:1, 3-times speed acceleration is achieved. In addition, double speed acceleration is achieved when the gear ratio is set to 1:0.5.

When the stopper 121 is located in a 0-step speed change position in the power transmission apparatus according to the present invention, the first to third ring gears 30*a*, 30*b* and 30*c* may remain in an idle state. In this state, if the wire 122 is pulled, the stopper 121 is locked with the fixing slot 21*a* of the first ring gear 30*a*, so that the first ring gear 30*a* is fixed and the second and third ring gears 30*b* and 30*c* still remain in the idle state. Thus, rotational force of the carrier 10 is transferred to the first planet gear 20*a* and the first sun gear 40*a*, so that the speed change is attained. In this case, 4-times speed acceleration is realized and the accelerated speed is transferred to the output shaft 41.

The 2-step speed change and the 3-step speed change are identical to the 1-step speed change, so detailed description thereof will be omitted.

After the speed change operation has been finished, the wire 122 is released so that the stopper 121 returns to the O-step speed change position.

EXAMPLE 1

Application of Power Transmission Apparatus

The power transmission apparatus using the planetary gear having a plurality of gear trains according to the present invention can be applied to a bicycle.

As shown in FIG. 5, when the power transmission apparatus is applied to the bicycle, a first pedal 200*a* is installed to one end of the input shaft 50. The other end of the input shaft 50 extends out of the housing 100 through the shaft extension 12 and a second pedal 200*b* is installed to the other end of the input shaft 50. A sprocket 300*a* can be installed to the output shaft 41 protruding out of the housing 100 or the power transmission apparatus can be directly installed to a bicycle wheel.

EXAMPLE 2

Application of Power Transmission Apparatus

The power transmission apparatus using the planetary gear having a plurality of gear trains according to the present invention can be applied to a motor bicycle as shown in FIG. 6. The motor bicycle refers to a 2-wheeled vehicle having engine displacement less than 125 cc (for instance, motor cycle or motor scooter) as defined in Article 3, Korean Automobile Management Act or a vehicle equipped with a motor having engine displacement less than 50 cc (rated output: less than 0.59 when electricity is used as power source) as defined in Article 2, paragraph 18 of Korean Road Traffic Act.

In the case of the motor bicycle, a motor 400 of the motor bicycle is coupled to the input shaft 50 installed on the carrier 10, and a sprocket 300b is connected to the output shaft 41 to transfer power to a rear hub of the motor bicycle.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A power transmission apparatus using a planetary gear having a plurality of gear trains, the power transmission apparatus comprising:
   - a cover (110) which is open or closed;
   - a housing (100) provided with a speed changing locking unit (120) therein;
   - a carrier (10) installed inside the housing (100);
   - a planet gear set (20) including three or more different sized planet gears (20a, 20b and 20c), in which at least three of the planet gear sets are installed on one side of the carrier (10) to rotate freely;
   - a ring gear set (30) including different sized ring gears (30a, 30b and 30c) rotating independently of each other, in which the planet gears (20a, 20b and 20c) mesh with internal teeth of the ring gears (30a, 30b, and 30c), respectively;
   - a sun gear set (40) including different sized sun gears (40a, 40b and 40c) formed in one body to be meshed with external teeth of the planet gears (20a, 20b and 20c) and having an output shaft (41) which outputs power to an outside of the housing (100); and
   - an input shaft (50) which is aligned coaxially to the output shaft (41) and rotates the carrier (10) by external force transmitted from the outside of the housing (100),
   - wherein the speed change locking unit (120) locks and releases selectively one of the ring gears (30a, 30b and 30c); and
   - wherein the input shaft (50) extends out of the housing (100) by passing through a shaft extension (12).

2. The power transmission apparatus as claimed in claim 1, wherein the planet gears (20a, 20b and 20c) of each planet gear set (20) are sequentially stacked on the carrier (10) in an order of diameters thereof.

3. The power transmission apparatus as claimed in claim 1, wherein the ring gears (30a, 30b and 30c) of the ring gear set (30) are formed at outer walls thereof with fixing slots (31a, 31b and 31c) which are spaced apart from each other at a regular interval.

4. The power transmission apparatus as claimed in claim 1, wherein a gear ratio between the sun gears (40a, 40b and 40c) and the planet gears (20a, 20b and 20c) is set in a range of 1:0.5 to 1:3.

5. The power transmission apparatus as claimed in claim 1, wherein the carrier (10) includes a support (11) for rotatably supporting each planet gear set (20) and a shaft extension (12) extending coaxially to the input shaft (50) in parallel to the support (11).

6. The power transmission apparatus as claimed in claim 1, wherein the output shaft (41) has a hollow pipe structure that surrounds an outer wall of a shaft extension (12).

7. The power transmission apparatus as claimed in claim 1, wherein the speed change locking unit (120) includes:
   - a stopper (121) that moves along a guide slot (130) formed in the housing (100) while being elastically supported so as to be selectively locked with one of fixing slots (31a, 31b and 31c);
   - a wire (122) for adjusting a position of the stopper (121); and
   - a body (123) having a cover (124), which is open or closed, and formed in the housing (100) to provide a movement route for the stopper (121).

8. The power transmission apparatus as claimed in claim 7, wherein the cover (124) includes a guide (125) inserted into the stopper (121) to guide sliding movement of the stopper (121).

* * * * *